United States Patent

Roush

(10) Patent No.: US 6,959,959 B1
(45) Date of Patent: Nov. 1, 2005

(54) SHEET AND POST CONTAINER SIDEWALL CONSTRUCTION

(75) Inventor: Mark Roush, Lafayette, IN (US)

(73) Assignee: Vanguard National Trailer Corp., Elmhurst, IL (US)

( * ) Notice: Subject to any disclaimer, the term of this patent is extended or adjusted under 35 U.S.C. 154(b) by 0 days.

(21) Appl. No.: 10/972,913

(22) Filed: Oct. 25, 2004

(51) Int. Cl.[7] ............................................. B62D 25/02
(52) U.S. Cl. .................................. 296/186.1; 296/191
(58) Field of Search ........................ 296/186.1, 181.3, 296/191; 52/578, 588.1, 582.1, 584.1

(56) References Cited

U.S. PATENT DOCUMENTS

| | | | |
|---|---|---|---|
| 4,015,876 A | 4/1977 | Hulverson et al. | |
| 4,420,183 A | 12/1983 | Sherman | |
| 4,810,027 A | 3/1989 | Ehrlich | |
| 4,904,017 A | 2/1990 | Ehrlich | |
| 4,940,279 A | 7/1990 | Abott et al. | |
| 4,958,472 A | 9/1990 | Ehrlich | |
| 5,112,099 A | 5/1992 | Yurgevich et al. | |
| 5,509,714 A | 4/1996 | Schmidt | |
| 5,664,826 A | 9/1997 | Wilkens | |
| 5,860,693 A | 1/1999 | Ehrlich | |
| 5,934,742 A * | 8/1999 | Fenton et al. ............ | 296/186.1 |
| 5,938,274 A | 8/1999 | Ehrlich | |
| 5,992,117 A | 11/1999 | Schmidt | |
| 5,997,076 A | 12/1999 | Ehrlich | |
| 6,003,932 A | 12/1999 | Banerjea et al. | |
| 6,199,939 B1 | 3/2001 | Ehrlich | |
| 6,220,651 B1 | 4/2001 | Ehrlich | |
| 6,412,854 B2 | 7/2002 | Ehrlich | |
| 6,450,564 B1 | 9/2002 | Sill | |
| 6,578,902 B2 | 6/2003 | Sill | |
| 6,607,237 B1 * | 8/2003 | Graaff et al. ............ | 296/186.1 |
| 6,824,341 B2 | 11/2004 | Ehrlich | |
| 2002/0101095 A1 * | 8/2002 | Gosselin et al. ............ | 296/191 |
| 2003/0080586 A1 * | 5/2003 | Ehrlich ........................ | 296/191 |
| 2004/0104597 A1 * | 6/2004 | Jones et al. ............... | 296/186.1 |

* cited by examiner

*Primary Examiner*—Jason Morrow
(74) *Attorney, Agent, or Firm*—Dowell Baker, P.C.; Anthony Dowell

(57) ABSTRACT

The improved sheet and post container sidewall construction of the present invention includes a post with a novel cross section that increases the rigidity of the post at a minimum thickness. The cross section of the post includes a central wall connected to lateral wings that attach to the outer protective skin of a container. The central wall is connected to the lateral wings by a connecting segment that lies inside the lateral edges of the central wall, creating a channel between the central wall and the lateral wings. This channel enables the vertical edge of a liner to be held securely in place behind the central wall. The cross section of the structural post also provides increased rigidity because the thickness of the metal of the post is doubled along a significant portion of the lateral edges of the central wall. This configuration provides increased rigidity for the post and achieves the important objective of providing smooth container walls free of recesses, potential protrusions and snag points.

18 Claims, 4 Drawing Sheets

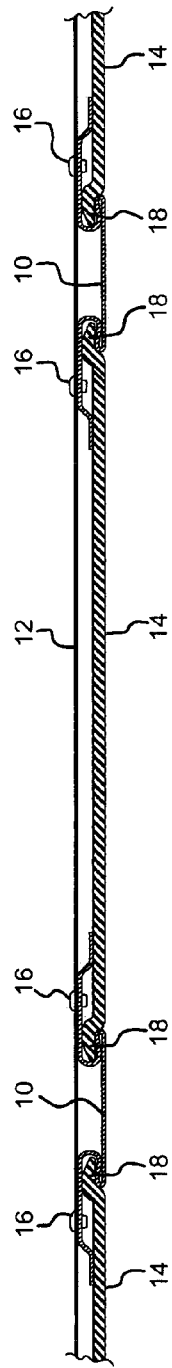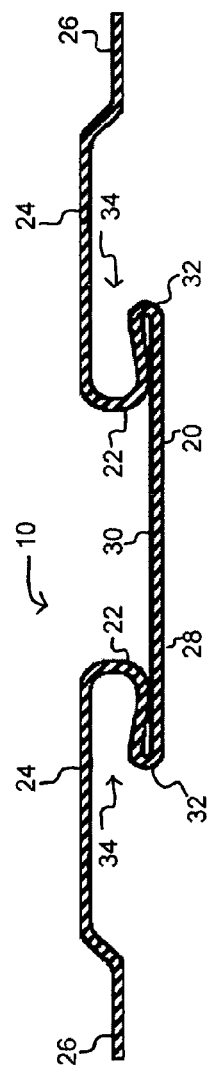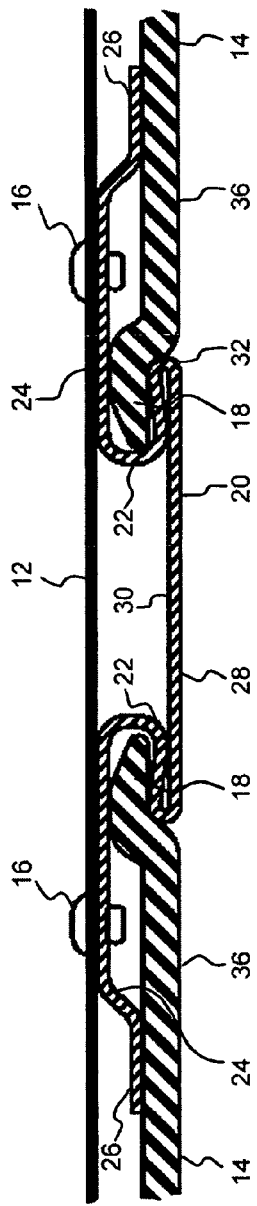

SHEET AND POST CONTAINER SIDEWALL CONSTRUCTION

FIELD OF THE INVENTION

The present invention relates generally to the sidewall construction for a cargo container, and more particularly to a thin walled sheet and post construction with a high rigidity and uniform interior surface.

BACKGROUND OF THE INVENTION

Designers of cargo containers have long faced many related challenges in the design of container sidewalls. First, the structural integrity of the overall container depends on the rigidity and strength of the sidewalls. Second, the sidewalls are optimally light in weight to reduce the transportation costs for the overall container.

Third, government regulations or industry standards often limit the exterior dimensions of cargo containers. Thus, to maximize the capacity of the container, designers of cargo containers seek to minimize the width of the walls of the container without compromising the structural integrity of the container.

Fourth, because cargo containers are repeatedly loaded and unloaded, the interior walls of the container must be resistant to the repeated impact of vehicles and implements used to load and unload the container, and must also optimally be free of protrusions and snag points that could impede the loading or unloading of the container. Fifth, means for securing and dividing cargo within a container are often desirable, and may be provided by incorporating logistics slots in the sidewalls of the container. Other considerations, including the cost and availability of the sidewall components and the ease of manufacturing the sidewalls, are also important.

These challenges are particularly acute in the design and construction of sidewalls for over-the-road trailers. Structural integrity for trailers is of course essential to the safe transportation of goods and materials on public highways. This structural integrity has conventionally been provided by vertical posts or ribs incorporated in the sidewalls of the trailer. In this prior art design, known as "sheet and post" construction, the vertical posts are typically formed by bending or roll forming galvanized steel or extruding aluminum into a hat shaped channel, thus providing rigidity and strength for the vertical post. Relatively thin sidewall panels, typically made of plywood or plastic, are attached to the vertical posts in the interior of the trailer and a protective outer skin, typically made of very thin aluminum, is attached to the vertical posts on the exterior of the trailer. A protective metal, wood or plastic liner may be provided at the base of the interior sidewall to protect the panels and posts from being damaged or pierced by vehicles loading and unloading the trailer.

This conventional design offers certain advantages, including high structural strength attributable to the vertical posts, readily available components, low cost and ease of manufacturing, among others. Also, although the thin interior panels are susceptible to damage, these panels are relatively inexpensive and easy to replace. Conventional sheet and post designs, however, suffer from a key disadvantage, namely, the thickness of the posts required to provide structural integrity for the trailer.

Current state and federal regulations limit the exterior width of a trailer to 102.38 inches. Conventional sheet and post sidewalls are typically at least 1.5 inches thick for each wall, leaving about 99 inches in interior width across the trailer. Several alternatives have been developed to decrease the thickness of trailer sidewalls and maximize trailer capacity. Typically, these designs dispense with the need for reinforcing posts by utilizing relatively thick sidewall panels that provide the structural integrity for the container body. These structural panels, made of solid aluminum or composite steel and plastic, are joined at their edges with vertical splicer plates on the inside and the outside of the trailer. This construction, which reduces the thickness of the trailer sidewalls to less than 0.625 inches each, has increased industry demand for trailers with an interior width of at least 101 inches, an unattainable goal for conventional sheet and post designs.

Although the increased capacity of trailers constructed with structural panels is a definite advantage, and the use of these designs is particularly suited for certain applications, these designs suffer from several disadvantages. For example, solid aluminum panels are expensive, difficult to fabricate and extremely heavy, leading to increased fuel costs in operation. In addition, the plates and rivets necessary to join these panels create snag points on the interior of the trailer which create problems when loading and unloading the trailer.

Composite panels are constructed of a core plastic material and an outer skin of aluminum or steel. Although lighter in weight than solid aluminum panels, composite panels are more expensive than the materials used in conventional sheet and post designs. To address the problem of snag points on the interior of the trailer, composite panels are typically coined at their side edges, or constructed with an offset at their side edges, so that the vertical splicer plate may be recessed from the interior surface of the composite panel. This process also increases the cost of using composite panels for trailer sidewalls. Aluminum and composite structural panels are also difficult and expensive to replace if a single panel becomes damaged in use.

Despite the increased expense and other disadvantages, aluminum and composite structural panels remain advantageous for certain applications. However, the need for cargo container sidewalls that combine the advantages of thin sidewalls with the advantages of sheet and post configurations has been recognized.

U.S. Pat. No. 6,607,237 issued to Wolfgang Graff and Thomas Huddle discloses a sheet and post sidewall configuration with a thickness less than 0.625 inches. This configuration includes relatively thin sidewall posts, interior plastic sheets that interconnect with adjacent posts and an exterior skin attached the posts. The thin sidewall posts disclosed in the '237 patent, however, are necessarily less rigid than the thicker posts utilized in conventional sheet and post designs and offer much room for improvement in the rigidity of a thin sidewall post configuration. Thus, the need remains for a highly rigid, yet thin, sidewall post for use in a sheet and post sidewall construction.

Also, in some embodiments of the invention disclosed in the '237 patent (FIGS. 2, 3, 6 and 14), the edges of the interior plastic sheets are inserted between the outer bent edges of the post and the exterior skin of the sidewall. In this embodiment, as graphically shown in FIG. 1 of the '237 patent, the vertical recesses of the post and the attachment rivets are exposed to the interior of the trailer. Thus, the interior wall of the trailer is not smooth and contains potential snag points.

In other embodiments of the invention disclosed in the '237 patent (FIGS. 4, 5, and 7), the vertical recesses of the post are covered by the edges of the interior plastic sheets.

However, in these embodiments, the plastic sheet is secured to the post by small channels on the rear (exterior) surface of the plastic sheet. Although potentially effective at securing the plastic sheet to the posts in a static environment, this configuration is necessarily less effective for securing the plastic sheet to the posts when the trailer is subjected to dynamic loads and stresses in operation, let alone the expected impact of vehicles when the trailer is loaded and unloaded. Thus, the need remains for a thin walled sheet and post configuration that securely attaches the sheets to the post while providing a uniform surface on the interior of the trailer without potential snag points.

Accordingly, an object of the present invention is to provide a sidewall construction for a cargo container that is lightweight yet rigid and strong.

A further object of the present invention is to provide a cargo container with thin sidewalls to maximize the capacity of the container.

Yet another object of the present invention is to provide a cargo container with interior walls resistant to the impact of vehicles and implements used to load and unload the container and also free of protrusions and snag points that could impede the loading or unloading of the container.

An additional object of the present invention is to provide a cargo containers with panels that can be easily removed and replaced in the event that they do become damaged.

A still further object of the present invention is to provide a cargo container with interior logistics slots in the sidewalls of the container for securing cargo loaded into the container.

Still another object of the present invention is to provide a highly rigid, yet thin, sidewall post for use in a sheet and post sidewall construction.

Yet another object of the present invention is to provide a thin walled sheet and post configuration that securely attaches the sheets to the post while providing a uniform surface on the interior of the trailer without potential snag points.

Finally, an object of the present invention is to provide a cargo container sidewall configuration that that is economical to manufacture and refined in appearance.

SUMMARY OF THE INVENTION

The present invention provides an improved sheet and post container sidewall construction. While maintaining the benefits and low cost of traditional sheet and post designs, the thin walled construction of the present invention also achieves many of the benefits of structural composite plate designs, including, when used for the sidewalls of an over-the-road trailer, an overall interior trailer width of at least 101 inches. The present invention also achieves the important objective of providing smooth trailer walls free of recesses, protrusions and snag points.

The thin sidewalls and high rigidity of the present invention are achieved by utilizing a structural post with a unique cross section. The cross section includes a central wall connected to lateral wings that attach to the outer protective skin of the container. The central wall is connected to the lateral wings by a connecting segment that lies inside the lateral edges of the central wall, creating a channel between the central wall and the lateral wings. This channel enables the vertical edge of a liner to be held securely in place behind the central wall.

The cross section of the structural post also provides increased rigidity because the thickness of the metal of the post is doubled along a significant portion of the lateral edges of the central wall. This configuration provides increased rigidity over prior art thin walled post designs.

Because the uneven surfaces of the post and the rivets that connect the post to the outer skin are covered and the interior side of the liner and the central wall are on the same plane, a smooth interior surface for the container is provided. This secure attachment method for the liner also eliminates the need for attachment rivets for the liner as well as the hooks and protrusions provided on the liners of prior art designs.

The structural post may also have liner support segments on the ends of the lateral wings. In addition to helping to hold the liner in place, these liner support segments help the liner to resist bending and deflection, thus eliminating the need for the protrusions or supports on the back of the liner found in prior art designs.

These and other advantages will become apparent as this specification is read in conjunction with the accompanying drawings and appended claims.

BRIEF DESCRIPTION OF THE DRAWINGS

FIG. 1 is a cross-sectional view of the sheet and post container sidewall construction of the present invention.

FIG. 2 is a cross-sectional view of the unique structural post of the present invention.

FIG. 3 is a magnified cross-sectional view of the sheet and post container sidewall construction of the present invention.

DETAILED DESCRIPTION

Figure 4:
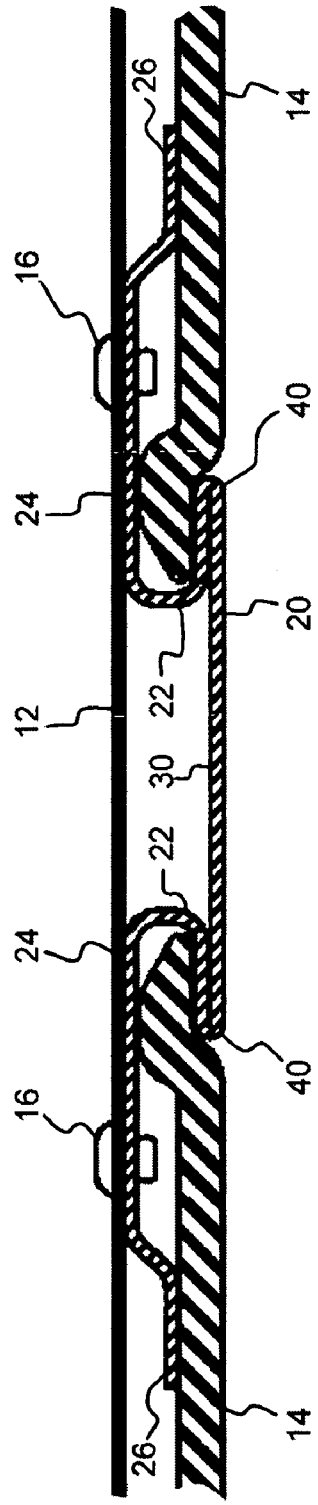
FIG. 4 is a magnified cross-sectional view of the sheet and post container sidewall construction with an alternative embodiment of the unique structural post of the present invention.

The present invention may be used with any type of transportable cargo container and is particularly suited for applications requiring a large, lightweight container that is regularly loaded and unloaded by utility vehicles. The improved sidewall construction of the present invention may be used with containers transported by road, rail, sea or air. However, for descriptive purposes, the present invention will be described in use with an over-the-road trailer.

FIG. 1 shows an improved sheet and post container sidewall construction of the present invention. The basic components of the sheet and post construction are the structural posts 10, the outer protective skin 12 of the trailer and the liners 14. The vertical posts 10 are preferably secured to the outer protective skin 12, (which is typically made of 0.050 inch thick aluminum) with rivets 16. The liners 14 extend between adjacent vertical posts 10 and are inserted at their vertical edges 18 into channels in the posts 10.

The liners 14 are preferably constructed of recycled or virgin polyethylene, and thus are flexible and resilient upon impact. The flexibility of the liners 14 enables them to be bent slightly and inserted into the posts 10 after the posts are secured in place. However, the liners 14 may also be slid into place from the top of the posts 10, or placed in position when the posts are secured in place. Although resistant to damage, the liners 14 may be easily removed for replacement in the event that the liners do become damaged.

As can be seen in FIG. 2, the post 10 includes the elements of a central wall 20, connecting segments 22, lateral wings 24 and liner support segments 26. The central wall 20 includes an interior side 28, and exterior side 30 and lateral edges 32. The configuration of the post 10 is preferably achieved by roll forming 14 gage galvanized steel. The roll forming process allows the metal to be doubled over at the lateral edges 32 of the central wall 20 so that the connecting segments 22 extend inwardly from the lateral edges 32 adjacent to the exterior side 30 of the central wall 20. By doubling the metal in this section of the post 10, the rigidity of the post is increased by approximately 50% over comparable thin post configurations.

The doubling of the metal adjacent the exterior side 30 of the central wall 20 also creates channels 34 on either side of the post 10. As shown in FIG. 3, these channels 34 allow the vertical edges 18 of the liners 14 to be secured between the lateral edges 32 of the central wall 20 and the lateral wings 24. The liner 14 is held securely in place because a substantial portion of the edge of the liner 14 is held in place behind the central wall 20 of the post 10. The liner support segments 26 also serve to bias the liner inward, pressing the vertical edge 18 of the liner 14 against the connecting segment 22 behind the central wall 20. Because the liner 14 is held securely in place by the novel configuration of the support post 10, rivets or screws are not needed to attach the liner to the post. Thus, unlike conventional sheet and post designs, potential protrusions and snag points are eliminated.

Figure 6:
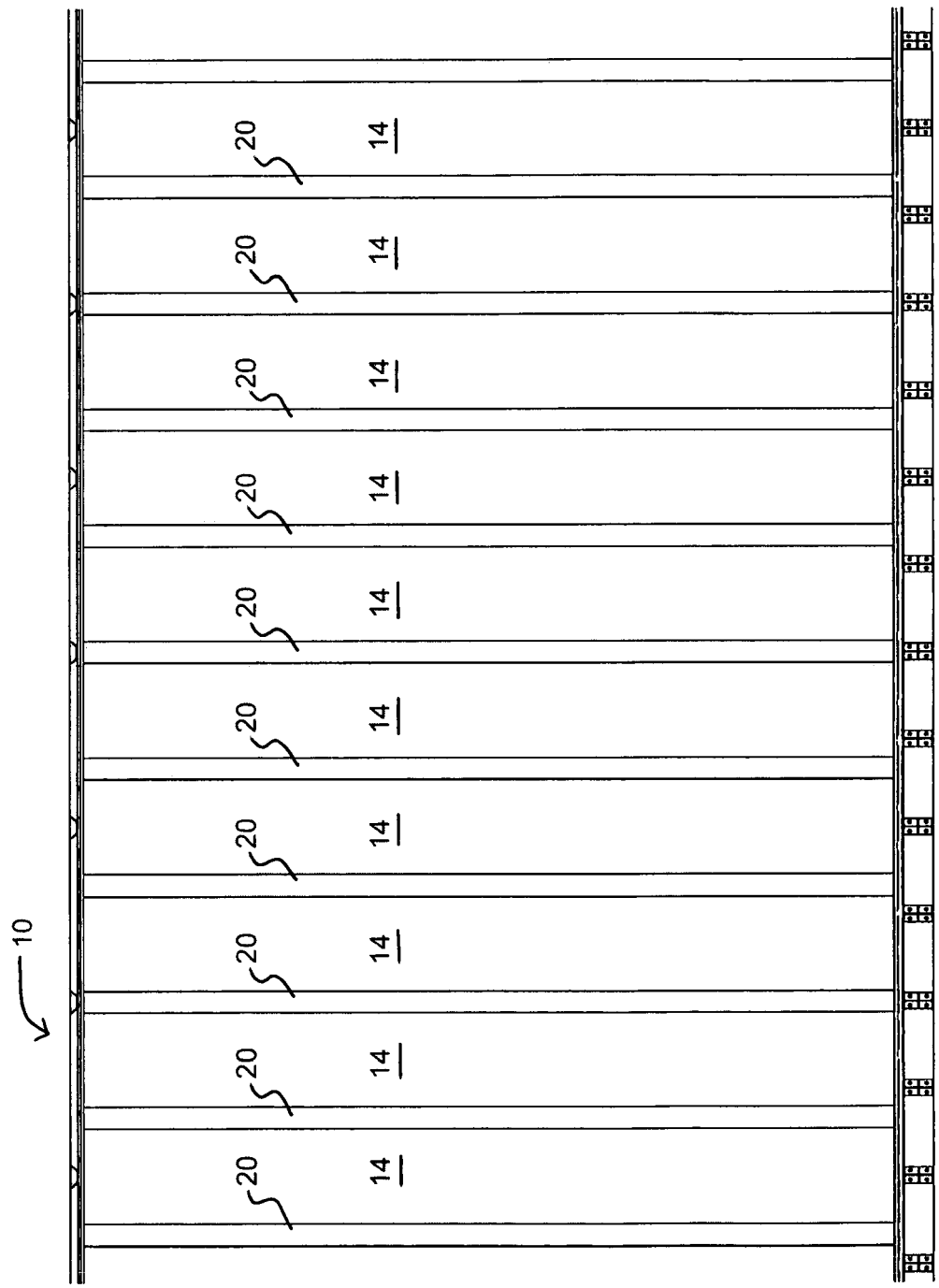
FIG. 6 is a side elevational view of the sheet and post container sidewall construction of the present invention.

In this position, the liner 14 also covers the rivet 16 so that the means for attaching the posts 10 to the outer skin 12 are unseen. Also, because the vertical edges 18 of the liner 14 are offset or recessed from the plane of the liner 14, the interior surface 36 of the liner 14 lies on the same plane as the interior side 28 of the central wall 20, thus providing a smooth interior surface throughout. The resulting smooth interior surface of the trailer can be seen in FIG. 6.

Figure 7:
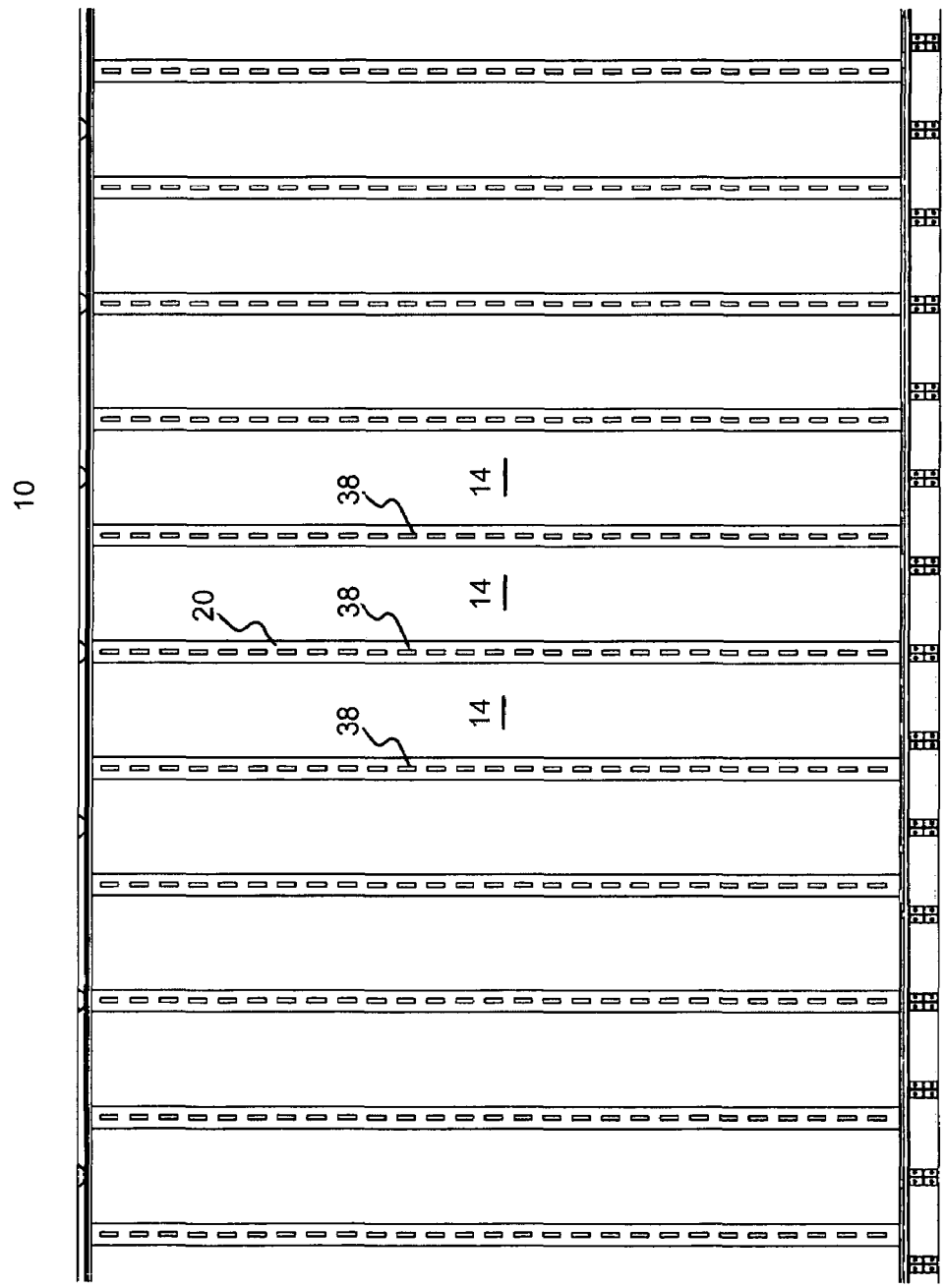
FIG. 7 is a side elevational view of the sheet and post container sidewall construction of the present invention with logistics slots in the structural posts.

In the preferred embodiment of the present invention, logistics slots are also provided in the central wall 20 of the support posts 10. Because the central wall 20 is spaced apart from the outer skin 12, logistic posts may be inserted in the logistics slots for securing and separating cargo. The sidewall construction of the present invention with logistics slots 38 is shown in FIG. 7.

The novel configuration of the support posts 10, which provides sufficient rigidity and allows the liners 14 to be secured behind the central wall 20 of the posts 10, enables the thickness of the post 10 to be reduced to approximately 0.537 inches. Including the 0.050 inch outer skin, the thickness of each sidewall is less than 0.6 inches, allowing the interior width of the trailer to exceed 101 inches. Thus, the present invention provides a key advantage of structural composite plate trailers, namely, an interior width of at least 101 inches, while simultaneously achieving many of the benefits and low cost of a conventional sheet and post design.

Figure 5:
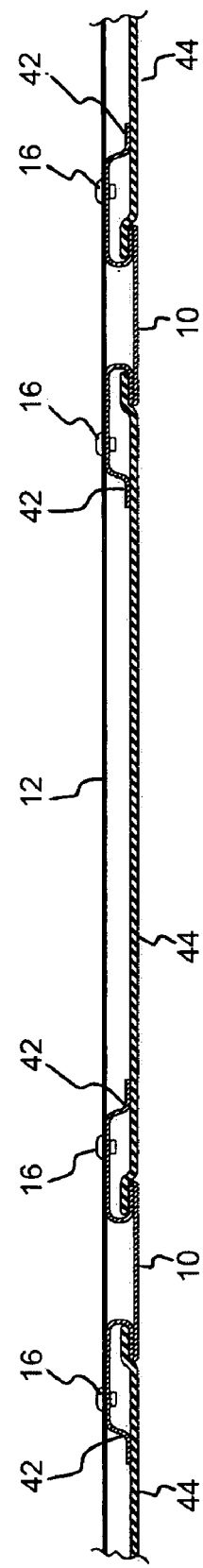
FIG. 5 is a cross-sectional view of the sheet and post container sidewall construction with yet another alternative embodiment of the unique structural post of the present invention.

The inventor contemplates several alterations and improvements to the disclosed invention. For example, developments in materials and the roll forming process enable the radius of the metal at the lateral edges 40 of the central wall 20 to be virtually eliminated, as shown in FIG. 4. However, this improvement to the disclosed invention is presently cost prohibitive. Also, the inventor contemplates using liners of various thicknesses with the same general post configuration of the present invention. By increasing the length of the liner support segments 42 on the post 10, as shown in FIG. 5, thinner liners 44 can be accommodated.

Other alterations, variations, and combinations are possible that fall within the scope of the present invention. Although the preferred embodiment of the present invention has been described, those skilled in the art will recognize other modifications that may be made that would nonetheless fall within the scope of the present invention. Therefore, the present invention should not be limited to the apparatus and method described. Instead, the scope of the present invention should be consistent with the invention claimed below.

What is claimed is:

1. A container having an interior for the storage and transport of cargo, the sidewall construction of the container comprising:

a flat sheet having an inner surface oriented towards the interior of the container and an outer surface exposed to the outside of the container;

a plurality of vertically oriented and parallel support posts inside the container, the support posts having a pair of lateral wings lying on a common plane and having an exterior side and an interior side, the support posts being connected to the inner surface of the flat sheet on the exterior side of the pair of lateral wings;

the support posts further having a central wall lying on a plane parallel to but spaced apart from the plane of the lateral wings, the central wall having an exterior side, an interior side and lateral edges;

the support posts further having a pair of connecting portions that connect the pair of lateral wings to the lateral edges of the central wall, a first segment of the pair of connecting portions connected to the lateral edges of the central wall and extending inwardly adjacent to the exterior side of the central wall, a second segment of the pair of connecting portions connected to the first segment and extending from a position adjacent to the exterior side of the central wall to connect with the lateral wings;

a plurality of liners having an interior side and an exterior side and extending between adjacent vertical support posts.

2. The container of claim 1, the liners further having a vertical edge for insertion into the vertical support posts between the lateral edge of the central wall and the lateral wing of the support posts.

3. The container of claim 2 wherein the interior side of the liners lies on the same plane as the interior side of the central wall of the support posts.

4. The container of claim 2 wherein the vertical edge of the liners is comprised of an offset portion lying on a plane parallel to but recessed from the plane of the liner, the offset portion being adapted for insertion into the vertical support posts in a channel formed by the connecting portion and the lateral wing of the support post.

5. The container of claim 1 wherein the support posts further have a pair of liner support segments connected to the lateral wings and extending towards the interior of container to contact the exterior side of the liners and support the liners.

6. The container of claim 1 wherein the support posts further include a plurality of logistics slots in the central wall of the support posts.

7. The container of claim 2 wherein the support posts further include a plurality of logistics slots in the central wall of the support posts.

8. An over-the-road trailer, the sidewall construction of the trailer comprising:
   an outer skin;
   a plurality of support posts attached to the outer skin, the support posts having a middle segment spaced apart from the outer skin and two flat lateral segments connected to the outer skin;
   a plurality of liners extending between adjacent support posts and having vertical edges for insertion into the support posts between and in contact with the middle segment and the lateral segment of the support posts.

9. The trailer of claim 8 wherein the liners further have an interior side and the middle segment of the support posts has an interior side and the interior side of the liners lies on the same plane as the interior side of the middle segment of the support posts.

10. The trailer of claim 8 wherein the support posts further include a plurality of logistics slots in the middle segment of the support posts.

11. An over-the-road trailer, the sidewall construction of the trailer comprising:
    an outer skin;
    a plurality of support posts attached to the outer skin, the support posts having a first side channel and a second side channel immediately adjacent to the outer skin, the first side channel and the second side channel lying on the same plane and opening in opposite directions towards the side of the post;
    the support posts further having a front wall connecting the first side channel and the second side channel, the front wall extending laterally beyond at least a portion of the first side channel and the second side channel;
    a plurality of liners extending between adjacent support posts and having vertical edges for insertion into the side channels of the support posts.

12. The trailer of claim 11 wherein the support posts further include a plurality of logistics slots in the front wall of the support posts.

13. A post for use in the construction of a container sidewall, the cross section of the post comprising:
    a first central portion having a front forward surface, a back rearward surface and two lateral edges;
    a pair of second portions connected to and extending inwardly from the two lateral edges on the rearward side and adjacent to the first central portion;
    a pair of third portions connected to the pair of second portions and extending rearwardly from the back rearward surface of the first central portion;
    a pair of fourth portions connected to the pair of third portions, the pair of fourth portions extending outwardly past the two lateral edges of the first central portion;
    the second portions, third portions and fourth portions creating a channel for the receipt of a side edge of a panel adapted for connection to the post.

14. The post of claim 13, the cross section further comprising a pair of fifth portions connected to the pair of fourth portions, the pair of fifth portions extending forwardly and further outwardly from the pair of fourth portions.

15. The post of claim 13 wherein the first central portion of the pole includes a plurality of logistics slots.

16. A post for use in the construction of a trailer sidewall, the post comprising:
    the post having a middle segment, a first lateral segment connected to the middle segment by a first connecting segment and a second lateral segment connected to the middle segment by a second connecting segment;
    a first side channel formed by the front wall, the first connecting segment and the first lateral segment;
    a second side channel formed by the front wall, the second connecting segment and the second lateral segment;
    the first side channel and the second side channel lying on the same plane and opening in opposite directions to provide for the receipt of a side edge of a panel on each lateral side of the post;
    the first lateral segment and the second lateral segment being flat and having a plurality of openings to provide for the attachment of the post to an outer trailer liner.

17. The post of claim 16 wherein the middle segment the post includes a plurality of logistics slots.

18. An over-the-road trailer, the sidewall construction of the trailer comprising:
    a plurality of vertical posts, the posts being formed of roll formed metal and having a horizontal cross section wherein at least a portion of the metal is formed so that it touches at least another portion of the metal;
    the vertical posts further having a first side channel and a second side channel opening in opposite directions towards the side of the posts;
    and a plurality of liners extending between adjacent vertical posts and having vertical edges for insertion into the side channels of the vertical posts.

* * * * *